United States Patent [19]
Hepworth et al.

[11] 3,709,854
[45] Jan. 9, 1973

[54] PETROLEUM RESINS

[75] Inventors: Paul Hepworth; Ian Stanley Ripley; Norman Scott, all of Stockton-on-Tees, England

[73] Assignee: Imperial Chemical Industries Limited, London, England

[22] Filed: Sept. 1, 1971

[21] Appl. No.: 177,113

[30] Foreign Application Priority Data

Sept. 7, 1970 Great Britain..................42,768/70

[52] U.S. Cl...........................260/82, 260/33.6 PQ
[51] Int. Cl........................C08f 15/04, C08f 15/42
[58] Field of Search.......................260/82

[56] References Cited

UNITED STATES PATENTS

| | | |
|---|---|---|
| 2,734,046 | 2/1956 | Nelson et al..........................260/82 |
| 2,754,288 | 7/1956 | Banes et al...........................260/82 |
| 2,894,937 | 7/1959 | Banes et al...........................260/82 |
| 2,159,220 | 5/1939 | McNulty et al........................260/82 |
| 2,092,295 | 9/1937 | van Peski et al......................260/82 |
| 2,122,826 | 7/1938 | van Peski et al......................260/82 |
| 2,750,359 | 6/1956 | Hamner et al........................260/82 |

*Primary Examiner*—Harry Wong, Jr.
*Attorney*—Cushman, Darby & Cushman

[57] ABSTRACT

In a process in which a $C_5$ fraction from a cracked naphtha or gas oil is polymerized with the help of a Friedel Crafts catalyst to produce a petroleum resin, the resin properties are improved and polymerization time reduced by heating the $C_5$ fraction to a temperature of at least 160°C for a period of up to 5 hours before the polymerization.

7 Claims, No Drawings

PETROLEUM RESINS

This invention relates to the production of petroleum resins.

The processing of crude petroleum gives rise to various hydrocarbon fractions which may subsequently be "cracked" by heating, usually in the presence of steam, to produce a range of lower boiling products among which ethylene and propylene feature prominently. Naphtha (boiling range 32° to 205°C) and gas oil (boiling range 205° to 430°C) are suitable cracking feedstocks. As well as ethylene and propylene the cracked product also contains hydrocarbons of increasing molecular weight and boiling point from butenes through pentenes, hexanes, naphthenes, aromatics to cyclic and acyclic hydrocarbons of even higher carbon number. It is customary to fractionate these hydrocarbons by distillation into groups of compounds with similar boiling points. Thus, the $C_4$ hydrocarbons removed as one fraction are followed by a range of compounds which may be designated for convenience as a $C_5$ stream although containing residual $C_4$ hydrocarbons and some lower boiling $C_6$ hydrocarbons. It is this $C_5$ stream, with or without further refining, which forms a suitable feedstock for the production of petroleum resins.

The resins, which vary in their properties as the hydrocarbon feedstock used in their preparation varies, are generally produced by treating the feedstock with a polymerization catalyst such as aluminum chloride. The unsaturated hydrocarbons in the feedstock undergo homo- and cross polymerization reactions which give rise to a resinous product. For commercial exploitation there are certain properties which are very desirable in the finished resin, one of which is a ready solubility in common hydrocarbon solvents such as white spirit and toluene. We have found that this solubility of the resin is critically dependant on the ratio of mono- to conjugated diolefines in the polymerization feedstock and that by adjusting the mono-olefine to conjugated diolefine ratio a soluble resin may be produced. We have further found, however, that an unsuitable feedstock, i.e. a feedstock which would normally produce an insoluble resin because its ratio of conjugated diolefines to mono-olefines is too high, may be converted into a suitable feedstock by a process of thermal treatment without the need for addition of mono-olefines or conjugated diolefines.

According to the invention therefore a feedstock for petroleum resin manufacture comprising a $C_5$ stream distilled from a cracked naphtha or gas oil is preheated before conversion to the resin by heating to a temperature of at least 160°C for a period of up to 5 hours. In general the higher the temperature the shorter the time, and vice versa.

The $C_5$ stream is derived from a thermally or steam cracked naphtha or gas oil and typically boils in the range 10° to 80°C. It generally contains most of the following hydrocarbons, isoprene, cis and trans piperylene, n-pentane, isopentane, pentene-1, cyclopentadiene, dicyclopentadiene, trans-pentene-2, 2-methylbutene-2, cyclopentene, cyclopentane and benzene. If desired this $C_5$ stream may be further refined before being used in the process of the present invention, e.g. the isoprene may be removed by distillation.

The $C_5$ stream is heated to a temperature of at least 160°C, preferably to a temperature in the range 160° to 200°C, particularly 170°C, usually under its autogeneous pressure. The time required for the reaction to take place is up to 5 hours and is preferably 0.05 to 1.5 hours when the temperature is about 170°C.

When the $C_5$ stream has been subjected to the pretreatment in accordance with the present invention it may be polymerized by means of a catalyst to produce a resin. Thus Friedel Crafts catalysts are suitable e.g. inorganic halides and inorganic strong acids. Inorganic halides are generally preferred and include halides of aluminum iron, tin, boron, zinc, antimony and titanium which may be used in conjunction with a hydrogen halide such as hydrogen chloride. For example, treatment with aluminum chloride preferably complexed with hydrogen chloride in an aromatic solvent such as toluene or a xylene produces a solution from which the resin may be recovered. Preferably, however, the Friedel Crafts catalyst is used in an aromatic solvent which is a benzene which is liquid at the temperature of the polymerization and which is substituted by at least one secondary or tertiary alkyl group or by a cycloalkyl group, e.g. tert.butyl benzene, p-cymene, p-isobutyl toluene, p-ethyl-tert.amyl benzene or, in particularly, cumene. Such catalysts are described in our co-pending British Pat. Application No. 5097/71 a complex of aluminum chloride, cumene and hydrogen chloride being preferred. The polymerization of the $C_5$ feedstock is preferably carried out at a temperature of −100° to +100°C under atmospheric pressure and the catalyst is finally broken down and removed from the polymer by treatment, for example with alcoholic ammonia or aqueous alkali followed by one or more washes with water and, optionally, a steam distillation, to remove residual monomers. It is a further advantageous feature of the invention that under comparable conditions the product of the present process takes less time to polymerize than a starting material which has not undergone the pretreatment.

Although we do not wish to be bound by any theoretical speculation it is our opinion that the pretreatment of our novel process alters the composition of the $C_5$ stream, probably by dimer formation notably among the conjugated diolefines. The resin is thus made up of the dimers cross polymerized with other unsaturated components which are present, whereas in the untreated $C_5$ stream the resin is formed mainly from the monomeric components. The process of our invention therefore as well as producing soluble resins also produces a resin of novel structure in a reduced polymerization time.

The heat treatment at a temperature of at least 160°C and/or the polymerization of the feedstock may be carried out batchwise or continuously, preferably the latter.

The invention will now be further described with reference to the following Examples.

EXAMPLE a. A $C_5$ stream from a steam cracked naphtha comprised isoprene, cis and trans-piperylene, n-pentane, isopentane, pentene-1, cyclopentadiene, dicyclopentadiene, trans-pentene-2, 2-methyl butene-2, cyclopentene, cyclopentane and benzene. This stream was heated for 6 hours at 120°C to convert the cyclopentadiene to dicyclopentadiene leaving the concentration of the monomer at less than 1percent (if the cyclopentadiene remains as the monomer it tends to form a gelatinous precipitate of polycyclopentadiene on subsequent polymerizing). This heat soaked material was then treated with an aluminum chloride/hydrogen chloride/toluene complex (equivalent to 1 to 2percent aluminum chloride based on the quantity of $C_5$ stream used) at ambient temperature for 4 hours (the complex was added over a 3 hour period). The catalyst was next precipitated as aluminum hydroxide by adding ammoniacal methanol. The aluminum hydroxide was filtered off and the solution steam distilled to remove low molecular weight oils and unreacted dicyclopentadiene. The residue comprised the resin.

When the "heat-soaked" material contained a disproportionate amount of conjugated diolefines to mono-olefines a resin was obtained which was insoluble in the usual hydrocarbon solvents such as white spirit and toluene. This could be overcome by adding diisobutene, methyl styrene or isobutene as a source of mono-olefine to the feedstock before the polymerization. Too much mono-olefine, however, resulted in a very soft resin.

b. A $C_5$ stream as defined in (a) above but which was deficient in mono-olefines and hence gave an insoluble resin was heated under autogeneous pressure at 170°C for one hour. The product of the pretreatment was polymerized as above, the polymerization taking 2 hours but otherwise being identical with (a). The product was a resin soluble in conventional aliphatic, cycloaliphatic and aromatic solvents and which compared with that produced in (a) as follows:

|  | (a) | (b) |
|---|---|---|
| Yield | 44% based on weight of $C_5$ stream feed | 40% based on weight of $C_5$ stream feed |
| Softening Point | 95°C | 99°C |
| Total time of reaction | 10 hours | 3 hours |

I claim:

1. In a process for the production of a petroleum resin soluble in hydrocarbon solvents by polymerizing in the presence of a Friedel Crafts catalyst a $C_5$ stream distilled from a cracked naptha or gas oil, the improvement which comprises heating the $C_5$ stream to a temperature in the range of at least 160°C to about 200°C for a period of up to 5 hours before carrying out the polymerization 2. The process of claim 1 in which isoprene present in the $C_5$ stream is removed before the heating to a temperature of at least 160°C.

3. The process of claim 1 in which the $C_5$ stream is heated at 170°C for 0.05 to 1.5 hours.

4. The process of claim 1 in which the Friedel Crafts catalyst is aluminum chloride complexed with hydrogen chloride in an aromatic solvent.

5. The process of claim 4 in which the aromatic solvent is toluene, xylene or a benzene which is substituted by at least one secondary or tertiary alkyl group or by cycloalkyl group.

6. A process of claim 1 in which the polymerization is carried out at a temperature in the range −100° to +100°C.

7. The process of claim 1 in which a $C_5$ stream boiling in the range 10° to 80°C which has been distilled from a stream cracked naphtha is heated at 170°C for 0.05 to 1.5 hours and is then polymerized by contact with an aluminum chloride and hydrogen chloride complex in toluene or cumene at a temperature in the range −100° to +100°C to yield a petroleum resin which is recovered.

* * * * *